US009027977B2

(12) United States Patent
Newth

(10) Patent No.: US 9,027,977 B2
(45) Date of Patent: May 12, 2015

(54) CHIMNEY TILE REMOVAL TOOL

(71) Applicant: Gregory Lee Newth, Montague, MA (US)

(72) Inventor: Gregory Lee Newth, Montague, MA (US)

( * ) Notice: Subject to any disclaimer, the term of this patent is extended or adjusted under 35 U.S.C. 154(b) by 0 days.

(21) Appl. No.: 14/162,475

(22) Filed: Jan. 23, 2014

(65) Prior Publication Data

US 2014/0205420 A1 Jul. 24, 2014

Related U.S. Application Data

(60) Provisional application No. 61/849,252, filed on Jan. 23, 2012.

(51) Int. Cl.

| | |
|---|---|
| ***B66C 1/00*** | (2006.01) |
| ***C03B 35/20*** | (2006.01) |
| ***B66C 1/48*** | (2006.01) |
| ***B66C 1/44*** | (2006.01) |

(52) U.S. Cl.
CPC .. *B66C 1/48* (2013.01); *B66C 1/442* (2013.01)

(58) Field of Classification Search
USPC ......... 294/118–119, 11, 16, 50.8, 164, 110.1, 294/81.61, 97, 63.1, 95
See application file for complete search history.

(56) References Cited

U.S. PATENT DOCUMENTS

| | | | |
|---|---|---|---|
| 1,457,445 | A | 6/1923 | Marcum |
| 1,577,347 | A | 3/1926 | Neumann |
| 2,160,472 | A | 5/1939 | Cizek |
| 2,370,528 | A | 2/1945 | Fontaine |
| 2,794,669 | A | 6/1957 | Schardinger |
| 4,500,078 | A | 2/1985 | Brennan |
| 4,603,747 | A | 8/1986 | Golden |
| 5,881,420 | A | 3/1999 | Bruckelmyer |
| 6,254,157 | B1 | 7/2001 | Yakushinji |
| 8,454,065 | B2 | 6/2013 | Wolford |
| 8,465,071 | B2 | 6/2013 | Risi et al. |
| 2004/0135389 | A1 | 7/2004 | Helms |

FOREIGN PATENT DOCUMENTS

| | | |
|---|---|---|
| JP | 05132282 | 5/1993 |
| JP | 2005214607 | 8/2005 |

OTHER PUBLICATIONS

PCT/US2014/012773 International Search Report, Aug. 22, 2014, (8) pages.

*Primary Examiner* — Stephen Vu
(74) *Attorney, Agent, or Firm* — C. Nessler

(57) ABSTRACT

A tool for lifting a tile from the bore of a chimney or other vertical opening has pivotably connected arms. Jaws at the lower ends of the arms are offset from a lifting point of the tool and optionally, from the pivot point. An actuating mechanism closes the jaws. One mechanism comprises a screw that moves a nut and one or more toggle elements connected thereto. Another mechanism comprises toggle elements which connect to the upper ends of arms and pull on them when upward force is applied at a lifting point. A releasable latch keeps the arms of tool spaced apart while a tile wall is being engaged. At least one jaw is a thin plate; preferably the opposing jaw is pivotable. Both jaws may be angled relative to the principal axis of the tool.

12 Claims, 13 Drawing Sheets

CHIMNEY TILE REMOVAL TOOL

This application claims benefit of provisional patent application Ser. No. 61/849,252, filed Jan. 23, 2013.

TECHNICAL FIELD

The present invention relates to tools for lifting liner-tiles vertically from within the bore of vertical openings, such as the bore of a chimney.

BACKGROUND

A certain style of familiar American chimney which is made of laid up brick, stone or cement block is commonly lined with stacked-up fired clay tiles. The tiles protect the joints of the masonry and provide a smooth upward convective path for products of combustion from such as a fireplace or a heating system in a building. In typical construction, the tiles fit closely the bore of the masonry chimney and have tight-fit horizontal joints. See FIG. 1 of this application.

Chimney tiles may need to be replaced from time to time because they fracture during use or during cleaning of the chimney. In another circumstance, a building owner may want to install a metal liner, such as a round stainless steel conduit, within the chimney for the improvement which such provides. To accomplish that, it is ordinarily desirable to remove the ceramic tiles so a sufficiently large diameter of metal liner can be installed. The present invention facilitates the removal of tiles for such purposes.

While the uppermost tiles might be manually grasped and lifted from the top of the chimney, those which are further from the top have heretofore most often be removed by fracturing each tile into smaller pieces. A worker standing at the chimney top may use a weighted flail or rotating weight inserted into the bore of the chimney. The broken pieces of tile will fall along with other debris to the bottom of the chimney. That can create a mess or a removal problem when the chimney does not terminate in a fireplace. Misuse of the tile-breaker may damage chimney bricks. The patent literature describes prior art tools and methods that relate to the need to remove tiles, as exemplified by the following.

Golden U.S. Pat. No. 4,603,747 shows a motor driven rotary impact hammer which is suspended within a chimney from a vertical cable. The hammer fractures tiles so they fall to the bottom of the chimney.

Scherdinger U.S. Pat. No. 2,794,669 shows a cable-suspended chimney tile grasping device having shoes which move outwardly to frictionally engage the bore of a tile which can then be lifted or lowered within a chimney bore. In one embodiment, the tool is lowered while locked in a first compact configuration. The locking mechanism is then released by pulling on a line and opposing-side shoes to move laterally to engage the bore of a tile. When the tool is pulled upwardly by a lifting line the arms and levers in the device cause the shoes to exert increased lateral force against the tile interior.

Bruckelmyer U.S. Pat. No. 5,881,420 shows device, which comprises a horizontal debris-catching plate, for use when a chimney is being brush-cleaned. The device is lowered by means of a vertical rod and fixedly positioned within the flue of the chimney. When the vertical rod is twisted, a scissors mechanism causes opposing pads to expand horizontally within the bore of the chimney to frictionally grip the bore. While the patent mentions replacing tiles, the only function of the tool is to catch debris.

Yakushinji U.S. Pat. No. 6,254,157 and shows a device for lifting loads, such as concrete blocks. When pulled vertically, a compound link mechanism causes closure of the grip ends of scissor-arms. Similarly, Helms U.S. Pat. Publication No. 2004/0135389 shows a lifting mechanism for plates. Opposing side arms having flat-plate grips squeeze together horizontally with scissor like action to grab a manhole cover. Upward pulling-force causes the squeezing action.

Wolford U.S. Pat. No. 8,454,065 shows devices for lifting articles like hollow concrete blocks. In particular at FIG. 3 a scissor-arm device is shown. The device has parallel jaws which grab the vertical wall or web of a hollow concrete block. The jaws are at the ends of arms which move together as a result of the vertical lifting force transmitted to the arms by a link mechanism.

The prior art devices do not sufficiently serve the needs of persons working to remove chimney tiles in a quick and effective manner. Those prior art devices which frictionally clamp the bore will not work effectively on tiles which are vertically fractured. Those prior art devices which clamp on the exterior of an object, or onto the vertical web of a hollow object like a tile, are ill-suited to grab the edge of a tile which lying in close proximity to the masonry bore of a chimney. And once a tile is grasped there is a further need: The tile must be lifted in a way which avoids cocking and jamming within the bore of the chimney. Furthermore, since a chimney repair person is often working high on a roof in a hazardous location, possibly in sub-optimal weather conditions, any tool should be easy to use, and preferably light in weight. Of course a tool should be sturdy and easily maintained.

SUMMARY

An object of the invention is to provide a tool and method for quick and efficient removal of tiles and like liner pieces from the top of a chimney or other vertical shaft; in particular, to provide a means and method for lifting tiles from the bore of a chimney—whether the tiles be in one piece or fractured. Another object of the invention is to enable quick positioning of a tool for engagement and lifting of the edge of a tile within the bore of a chimney; and for lifting such an edge-engaged tile in a way which avoids jamming. A still further object is to provide a tool which is light in weight, reliable in performance and susceptible to economic manufacture.

In accord with the invention, an embodiment of tool for lifting a liner tile from the interior of a chimney has opposing jaws at the end of pivotable arms. The tile-grasping surfaces of the jaws are centered on a first axis (GG) that is spaced apart from the principal axis (HH) of the tool. Preferably, the pivot point of the arms is positioned between the first axis and the principal axis and the arms are asymmetrical. At least one jaw is a flat thin plate fixed to a first arm, for fitting in the narrow space between the tile wall and the masonry chimney. The plate will be curved if the tile is circular in cross section. Preferably, the opposing jaw is pivotably connected to the second arm and there is a pivotable-rotation limiter. The tool has an actuating mechanism for moving the arms and thereby closing or opening the jaws. In use a lifting rod is connected to a lifting point of the tool and the jaws are closed to grasp a tile wall by applying either upward force at the lifting point, or by rotating a screw which is part of an arm-actuating mechanism.

In an embodiment of tool there is an actuating mechanism which is connected to the arms and which comprises a screw. When the screw is turned by a lifting rod that is connected to the drive end of the screw, which is the lifting point of the tool—preferably with an interposed universal drive—that causes a nut to move along the length of the screw. One or more toggle elements connect the nut to one or both arms; and the nut motion causes the toggle elements to apply force to the arms, to pivot them and open and close the jaws. A preferred tool comprises an arm which has a tube portion within which the nut is a slidable when the screw is turned.

In another embodiment of tool the actuating mechanism closes the jaws when an upward pulling force is exerted by a lifting rod at the lifting point of the tool which lifting point is part of the actuating mechanism. Flexible or rigid toggle elements run from the lifting point to the upper ends of the arms, to pull the arms together when lifting force is applied. In this embodiment a latch keeps the arms and the jaws spaced apart as the tool is lowered and the jaws are engaged with the tile wall. The latch is then released, to allow the jaws to close, as by pulling the latch upwardly by means of a lanyard which either runs to the top of the chimney or is optionally wound around a rotatable part of the tool or lifting rod.

Tools may have arms with lower-end stub-arm portions that enable a jaw to be rotated relative to length of the rest of an arm and the principal axis of the tool. Rotation of the jaw angle changes the offset between the first axis of the jaws and the principal axis. That changes the distance of the lifting point from the jaw location and enables changing of the balance of a tool and tile combination about the lifting point, so a tile does not cock and jam in the chimney. The balance of a tool holding a tile may alternatively be changed by means of an adapter interposed between the lifting point and the lifting rod. The adapter pivots in a plane perpendicular to the principal axis of the tool and thereby changes the location of upward lifting force relative to the jaw location and first axis.

One or more cables or rods may be attached in auxiliary fashion to the tool in addition to a lifting rod for achieving good balance and avoiding cocking. The attachment of the cable or auxiliary rod is at a location on the tool which is spaced apart from the principal axis of the tool, in a direction opposite to the direction in which lies the first axis of the jaws. In use of some tool embodiments, the lifting rod may be used only for turning the actuating screw and the cable only will be used to lift the tool.

In a method of removing tiles which is associated with the use of tools of the present invention, the thin plate portion of a jaw is inserted into the small opening between a tile and the chimney while the jaws are open; the jaws are then closed by turning the lifting rod or pulling upwardly on the rod, to apply jaw-grasping force by means of the actuating mechanism; and, when the tile has been grasped, the assembly is lifted vertically by means of one or both of the lifting rod and an auxiliary cable connected to the tool at a location spaced apart from the lifting point of the tool.

The foregoing and other objects, features and advantages of the present invention will become more apparent from the following description of preferred embodiments and accompanying drawings.

DESCRIPTION

The disclosure of provisional U.S. patent application Ser. No. 61/849,252, filed Jan. 23, 2013, is hereby incorporated by reference.

Figure 1:
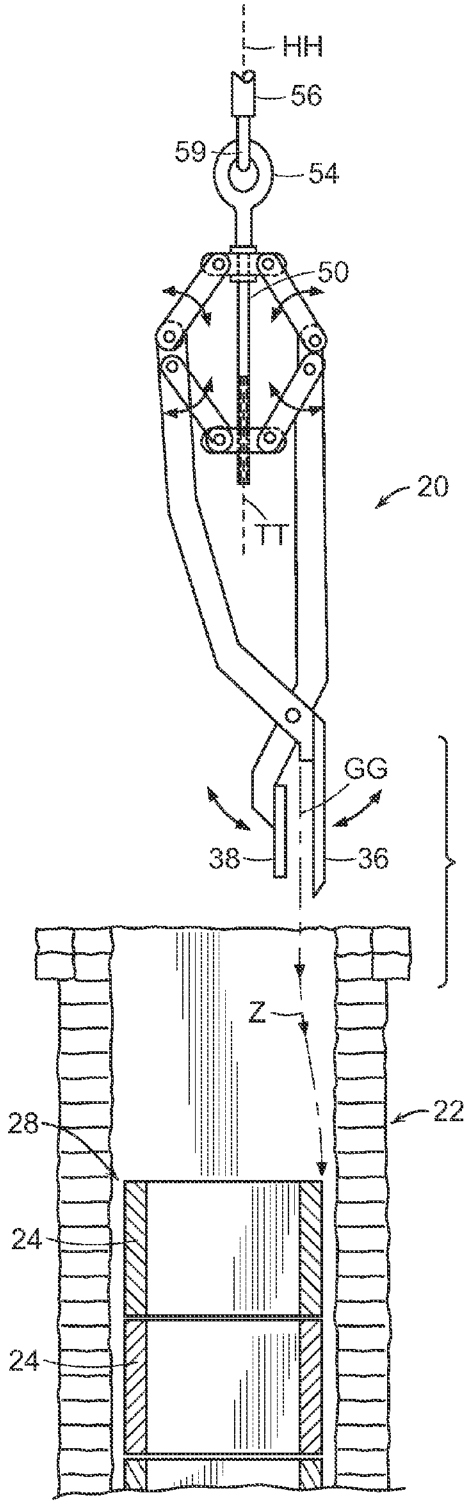
FIG. 1 shows a lifting tool embodiment along with the cross section of a chimney containing chimney tiles, showing how the tool is lowered into the chimney to grasp at tile.

FIG. 1 is vertical elevation view showing tile-removing tool 20, an embodiment of the present invention, suspended above the upper part of a chimney 22, which is shown in cross section. The bore of the chimney 22 is lined with a multiplicity of vertically-stacked liner tiles 24. There is a small space 28, typically about one inch, between the vertical wall of a tile and the interior surface of the masonry chimney—which surface may be irregular. In FIG. 1 tool 20 is shown as it is positioned for lowering into the bore of the chimney. The jaws 38, 36 of tool 20 are centered about a vertical axis GG. The tool is lowered along the path indicated by arrows Z by means of a shaft 56 which is connected to the eye bolt drive end 54 of screw 50. Jaw 36, which preferably has a chisel shape lower edge, is thin and is shaped to fit the space 28. It and equivalents are referred to here as the outer jaw and the other jaw is the inner jaw. When jaw 36 has been slipped into place, the jaws are closed so the jaws tightly grasp the tile wall by turning of shaft 56 and thus screw 50. The tool and tile are then lifted from the chimney. The axis of the upward pulling-force on the tool is offset from axis GG. Tiles are removed one tile after another by repeating the foregoing steps. A reverse action may be used to put new tiles in place. The foregoing summarizes the essential operation and use of an exemplary tool 20. More particulars of the tool construction, and variations on tool construction and tile-removal processes, are described below.

Figure 2:
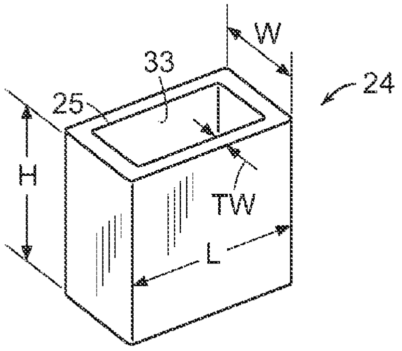
FIG. 2 is a perspective view of a typical chimney tile.

FIG. 2 is a perspective view of a typical rectangular tile 24 having a vertical wall 25. A typical tile is made ceramic such as fired clay may have a length L of 12 inches (30 cm), a width W of 8 inches, a height H of about 24 inches, and a wall thickness TW of about ¾ inch. Other tiles may be square, for instance 6×6, 8×8, or 12×12 inches (about 15×15, 20×20, or 30×30 cm). Tiles may weigh from 30 to 80 pounds (66 to 176 kilograms). Tiles may also have non-rectangular shapes, for instance they may be round. When a tile is grasped for lifting, it will preferably be grasped at the midpoint 33 of the tile's long dimension wall, although alternately it may be grasped at the midpoint of a short-dimension end; less preferably, it will be grasped substantially off-center.

Figure 3:
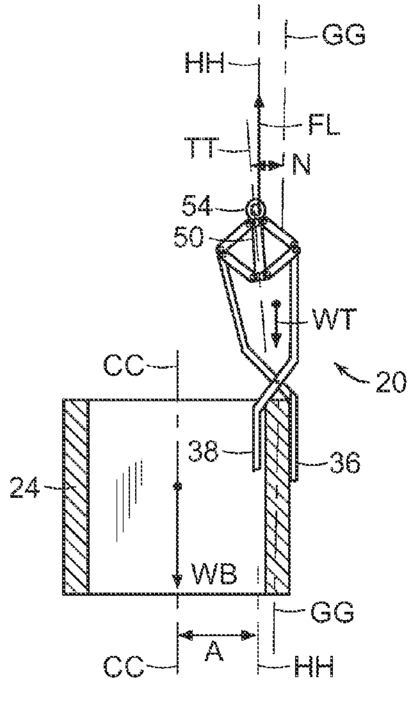
FIG. 3 is a schematic elevation view of a tile and tool, to illustrate certain geometric axial relationships.

FIG. 3 is a schematic diagram for representing certain axes and forces which associated with a tool (such as exemplary tool 20) and a tile which is being lifted. Tile 24 has a tile wall 25 and a central vertical axis CC which runs through the center of gravity indicated by the vector WB. Lifting force FL that is applied to the tool by means of a shaft connected to the lifting point, namely the upper/drive end 54 of a screw 50, runs along vertical axis HH which is parallel to the direction of gravity force. In use a pole or rod is connected to the end 54 and that rod may be used for lifting the tool and, when the tool has a screw, driving the screw to actuate the tool.

Screw 50 has an axis TT which is within about 0 to 5 degrees of parallelism with axis HH, according to the particulars of the tool. However, both axis HH and axis TT will pass through point 54. In the present invention, a tool may be characterized, as it hangs vertically under the force of gravity from the lifting point 54 of the tool, as having a principal axis, and that axis will lie along axis HH.

Vertical axis GG lies in the plane which is equidistant from the opposing tile-grasping surfaces of jaws 38, 36 which are preferably planar surfaces for grasping rectangular cross section tiles. When a tool is vertically disposed, as it is during use, axis GG is laterally spaced apart from axis TT at the elevation of the lifting point 54; and, that spacing is called here the offset N of the tool. Tool 20 has its own weight and related center of gravity, represented by vector WT. The location of the vertical axis along which WT lies may vary with differing tool construction but, given the offset of the jaws from axis TT, the axis of WT will tend to lie between axes TT and GG. Sometimes, including when the jaws have adjustable angles as described below the axis GG will not be parallel to TT, although in use it will be at least close to parallel to axis HH. In such instances, offset N will be the distance between the axis TT (or axis HH, as applies) and axis GG at the lengthwise (vertical) midpoint of the grasping portions of the jaws.

Tools of the present invention are preferably made of mild steel, but may be made of other sufficient-strength materials, including metals and plastics. Exemplary tool 20 may weigh about 10 pounds (22 kilograms) and exemplary tool 120 may weigh about 5 pounds (11 kilograms).

In some instances the size and fit of the tile and the smoothness of the chimney bore allow lifting of a tile with some tile-cocking and no resultant jamming. In other instances, the degree of tile-cocking force has to be minimized to avoid jamming. The aforementioned configuration of a tool and axial relationships is, in the first instance, one which works in the direction of lessening cocking of a tile which is being lifted. Referring again to FIG. 3, we can see that—with respect to the axis HH of the lifting force—even though weight WB of a tile tends to tilt the tool to the right with respect to its lifting point 54, there is a tendency for counteracting tilt to the left due to both the weight WT of the tool and the offset N of the jaw-axis GG.

Experiments have shown that an exemplary tools 20, 120 and 70 are useful when the dimension N is about 4 to 5 inches, preferably about 4.4 inches when lifting common tiles which have a short dimension W of 6 to 8 inches and a long dimension of 8 to 12 inches.

Figure 6:
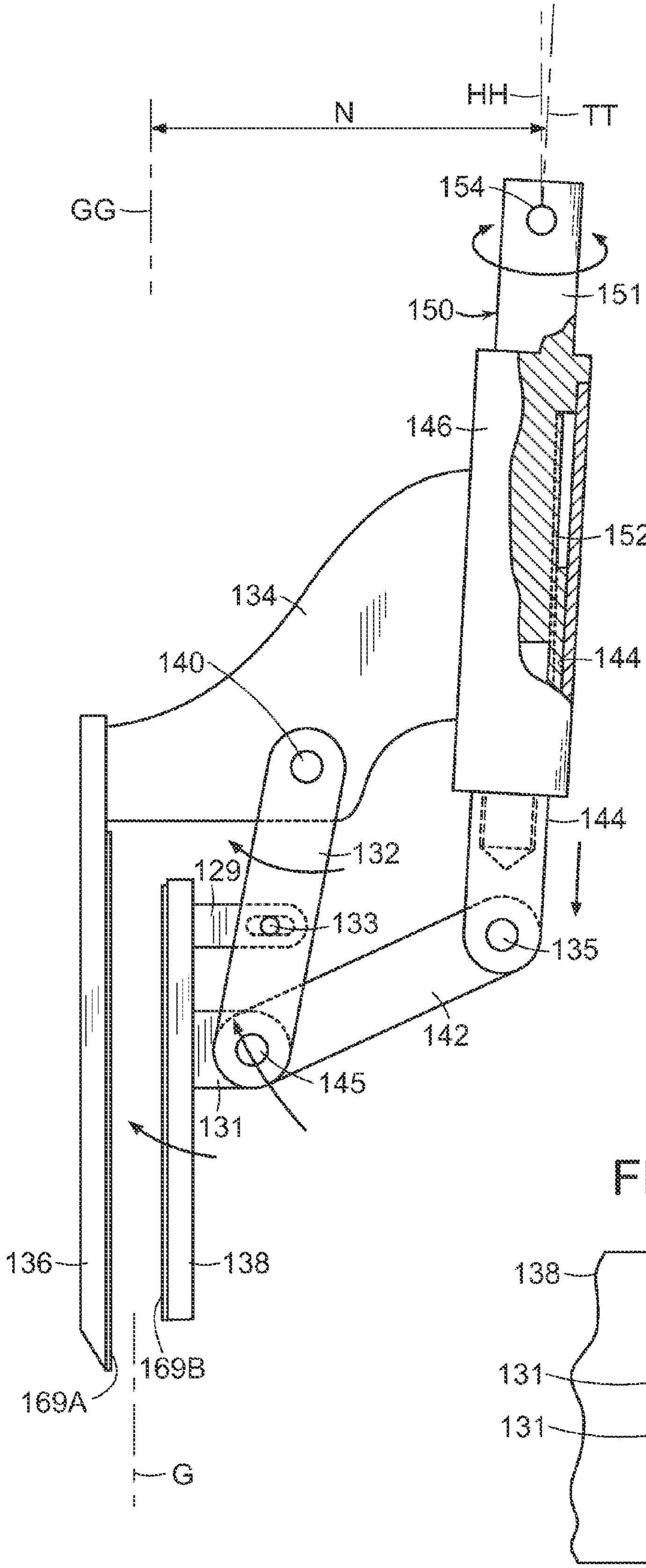
FIG. 6 is an elevation view of another lifting tool embodiment, where the tool has one toggle link and a screw mechanism for closing the jaws.

Tool 20 is an exemplary embodiment of the invention. It is described in detail first. Tool 120, shown in FIG. 6, is another exemplary embodiment. As will be appreciated, both exemplary tools embody the above-described force vector and axis relationships; and they each have in common a screw drive mechanism which acts on the arms through one or more toggle link elements.

Figure 4:
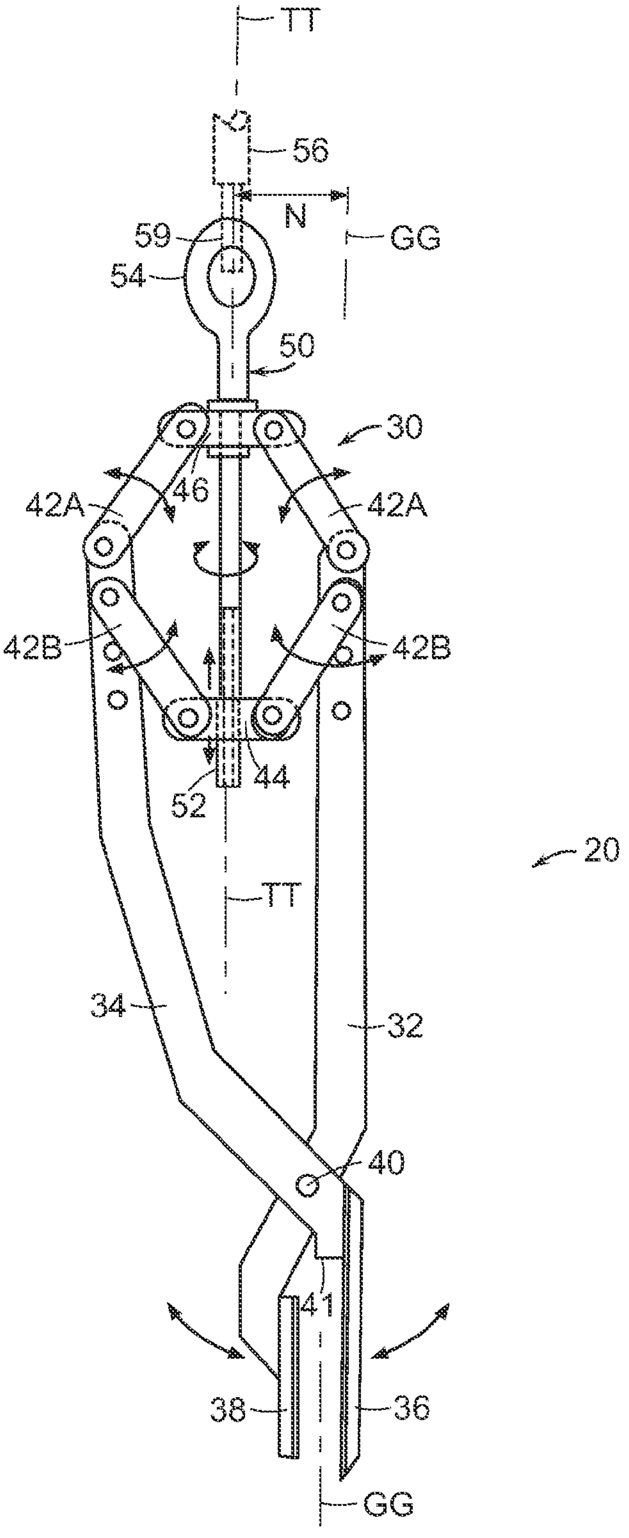
FIG. 4 is an elevation view of a lifting tool have a four-link toggle assembly and screw mechanism for closing the jaws.
Figure 5:
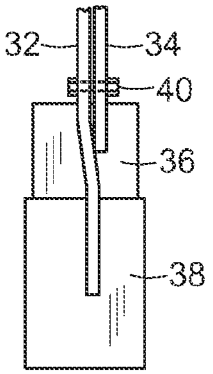
FIG. 5 is a fragmentary side view of the jaws of the tool shown in FIG. 4.

FIG. 4 is a planar view showing tool 20 in more particular detail. Tool 20 has to arms 34, 32 which are pivotally connected in scissor fashion by pin 40. The first (upper) end of each arm is connected to actuating mechanism assembly 30 which transmits actuating force to the arms. The actuating mechanism is described more particularly below. The second (lower) end of each arm 34, 32 is respectively connected to a jaw 38, 36. Each jaw has an opposing tile-grasping surface and the surfaces are spaced apart on either side of vertical axis GG. FIG. 5 is a side view of the jaws of tool 20, showing that they are preferably rectangular flat plates. The outer jaw, e.g., jaw 36, has to be thin at its lower or outer end, in order to fit in the small space between the tile wall and the chimney interior side. In contrast, the inner jaw, e.g., jaw 38, does not have to be thin. Other jaw configurations may be used, including ones comprising fork-tines or pins.

FIG. 5 shows that arm 32 has an offset or bend, so the ends of the arms align where force is applied to the tile. Alternatively, the other arm may be bent, or both arms may be bent equally, for the same purpose. Arms 32, 34 are asymmetrical. Arm 32 is preferably shaped so its outer surface is nominally in the same plane as lies the outer surface of jaw 36, which outer surface slides along the chimney bore during use of the tool. Arms 32, 34 each are bent, to make the spacing between upper ends of the arms sufficient for actuating mechanism (e.g., toggles and screw) construction. The distance to pivot 40 from the upper-arm point where force is applied to the arms is several times the distance between the pivot point 40 and the mid-point of the grasping surface of the jaws; preferably the ratio is about 3 to 1, to provide mechanical advantage. The combination of the leverages of the arms, and the toggle(s) and screw of the actuating mechanism enable a very powerful grasping force to be applied by the jaws when relatively little twisting force is applied to the screw.

Figure 19:
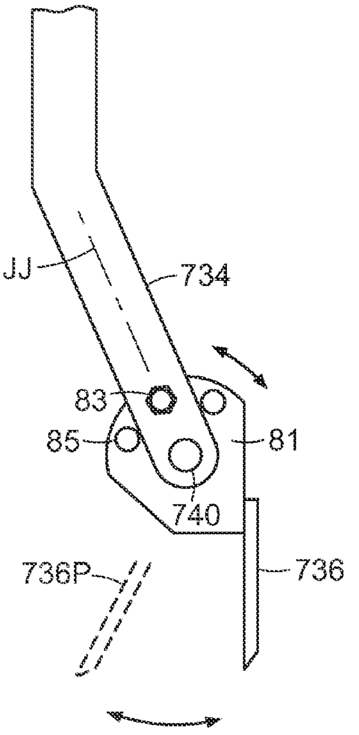
FIG. 19 shows a lifting tool arm with an incrementally adjustable-angle jaw.
Figure 23:
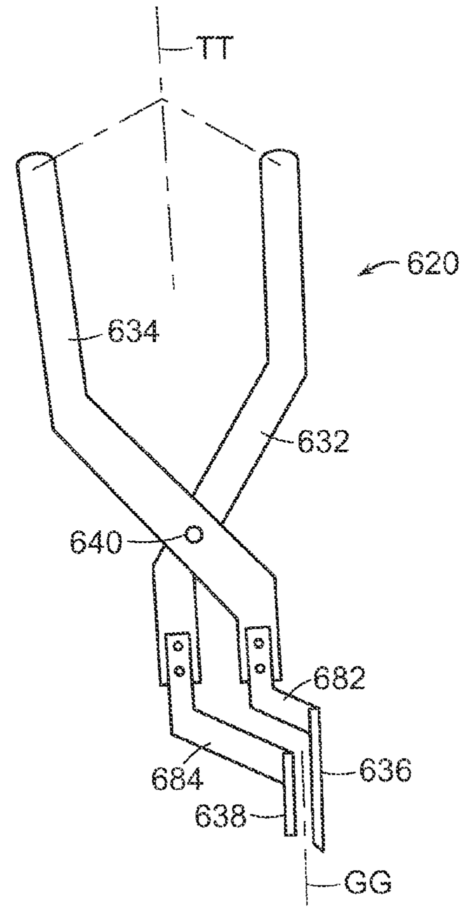
FIG. 23 shows a lifting tool having replaceable jaws.

The jaws are preferably integral with the arms, but as described by example in connection with FIG. 23 and FIG. 19, they may be replaceable. The jaws of tool 20 and other tools described hereafter preferably have a polymer facing layer that creates enhanced good frictional engagement with a smooth tile wall. An exemplary material is described below. An integral stop 41 limits the extent of engagement of the tool with the vertical edge of a tile wall, to avoid tool jamming in proximity to the pivot point of the arms.

FIG. 4 illustrates how the arms of tool 20 are closed by actuating mechanism 30 which in this embodiment is a combination of a screw mechanism and four-link toggle assembly. The multiple arrows indicate the motion of the parts when screw 50 is rotated. Rotation of the eye end 54 of screw 50 by means of drive rod 56 (shown in phantom) draws the upper and lower ends of the toggle assembly together, thus thrusting the upper ends of the arms outwardly and closing the jaws. As will be appreciated by the arrows in multiple drawings, a drive rod may be used both for rotation purposes and for lifting purposes, thus it is referred to interchangeably as a drive rod and a lifting rod.

More particularly: The toggle assembly comprises a pair of upper links 42A and a pair of lower links 42B. The lower ends of links 42A and the upper ends of links 42 B are pivotably connected to the upper ends of the arms. The lower ends of links 42B are pivotably connected to nut 44 which has a threaded through-hole to receive screw shaft 52. Nut 44 is an elongated or bar-like element, with a central threaded hole. The upper ends of links 42A are connected to bar 46. Screw 50 is journaled in the bar. By that is meant that the bar has a through-hole within which the upper end of screw 50 is received and may rotate. Screw 50 is captured in bar 46 by E-rings or the like. Bar 46 may be conceived as an elongated collar.

The screw mechanism of tool 20 thus comprises the elements 44, 46 and 50. When the drive end 54 of screw 50 is rotated by shaft 56 or other means in the proper direction (according to the "turn" of the thread portion 52 of the screw), block 44 is translated lengthwise along screw shaft 52 and corresponding axis TT toward bar 46. That causes toggles 42A, 42B to pivot in the plane of FIG. 4 and in the plane of arm rotation, increasing the spacing between the upper ends of the arms and decreasing the spacing between the lower ends of the arms and the connected jaws.

Figure 28:
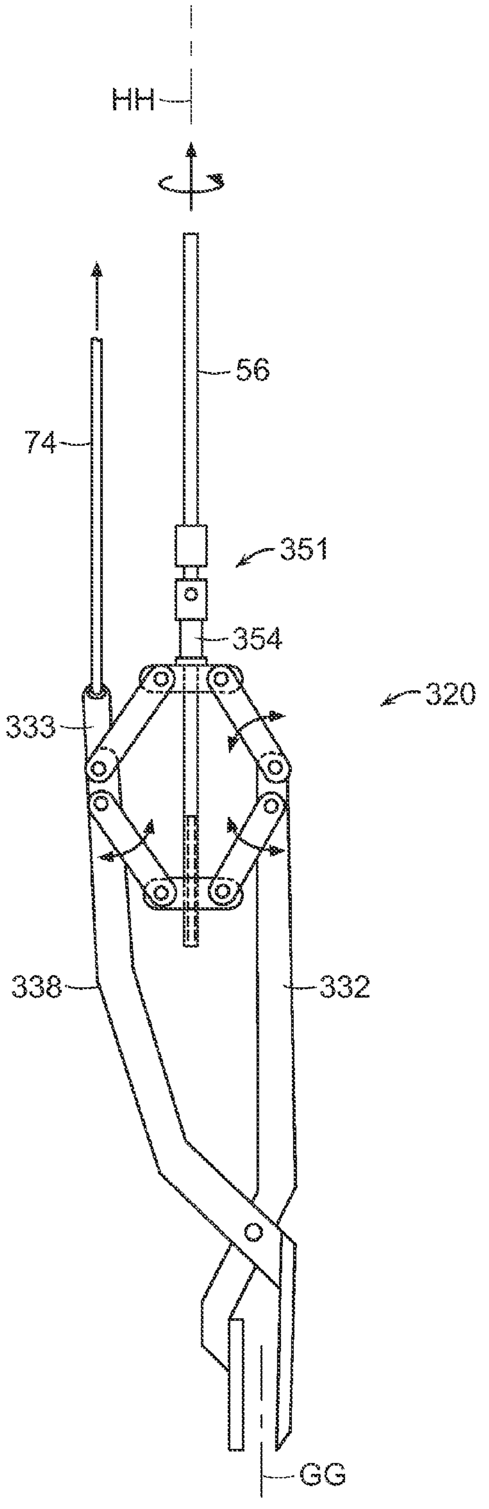
FIG. 28 is a view of a modification of the tool shown in FIG. 4, showing auxiliary lifting means.

The drive end eye bolt 54 and a ring end 59 on the drive shaft provides a desirable universal-type joint connection which is in most instances necessary to enable easy rotation of the screw when the axis TT of screw rotation is not well-aligned with the axis of rotation of the shaft 56, that is, with the axis of lifting HH. FIG. 28, discussed below, shows a universal joint 351 at the top of the screw of the toggle assembly. Other known universal joints may be used at the end of a drive/lifting rod or at the upper end of a screw, in this and other embodiments of the invention.

Figure 25:
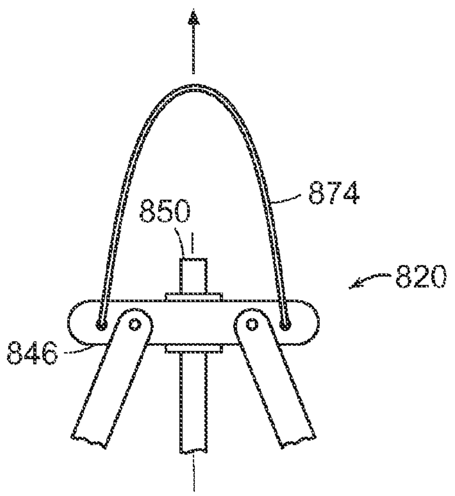
FIG. 25 is a fragmentary view of the upper end of a modification of a lifting tool like that shown in FIG. 4, where the tool includes a loop shape lifting cable.

FIG. 25 is a fragmentary view of the upper portion of alternate embodiment tool 820. The upper end of screw 850 is shaped only for driving, for instance it may have a square or hexagonal cross section. The bar 846 at the top of the toggle assembly is sufficiently long to enable connection of the ends of a cable 874 by which means the tool with or without a grasped-tile can be lifted. as indicated by the arrow.

Figure 6A:
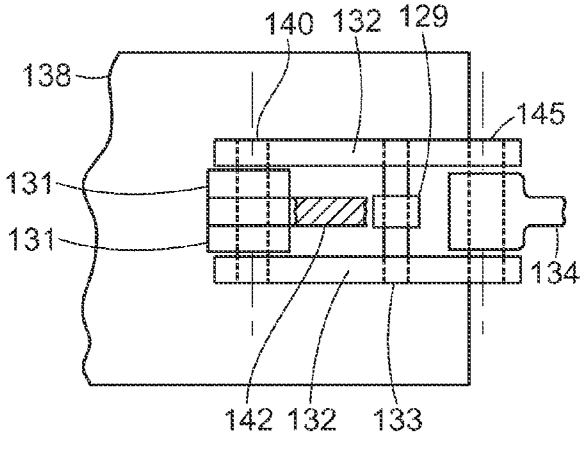
FIG. 6A is a partial side view of the tool shown in FIG. 6, looking at the right side of the tool.
Figure 7:
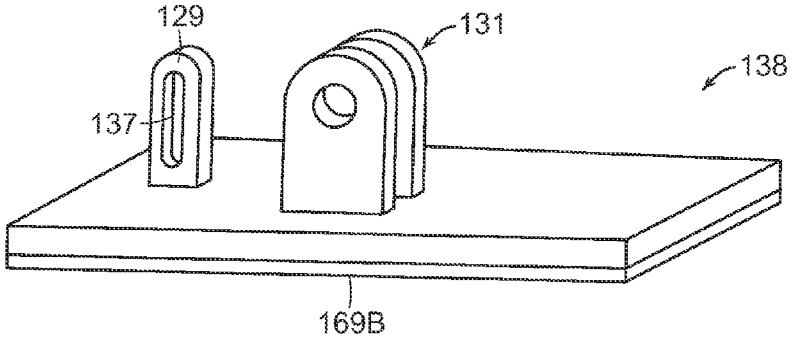
FIG. 7 is a perspective view of a jaw of the tool of FIG. 6.
Figure 8A:
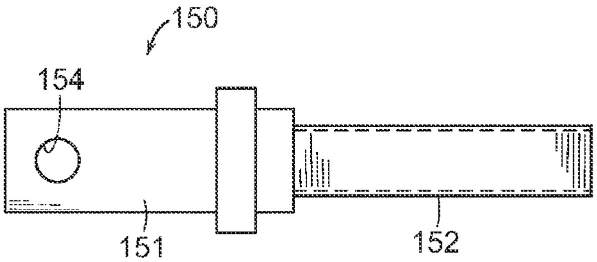
FIG. 8A is a side view of a screw used in the tool of FIG. 6.
Figure 8B:
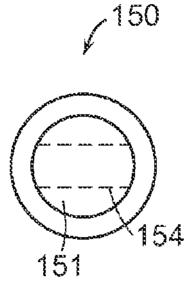
FIG. 8B is an end view of the screw shown in FIG. 8A.
Figure 9:
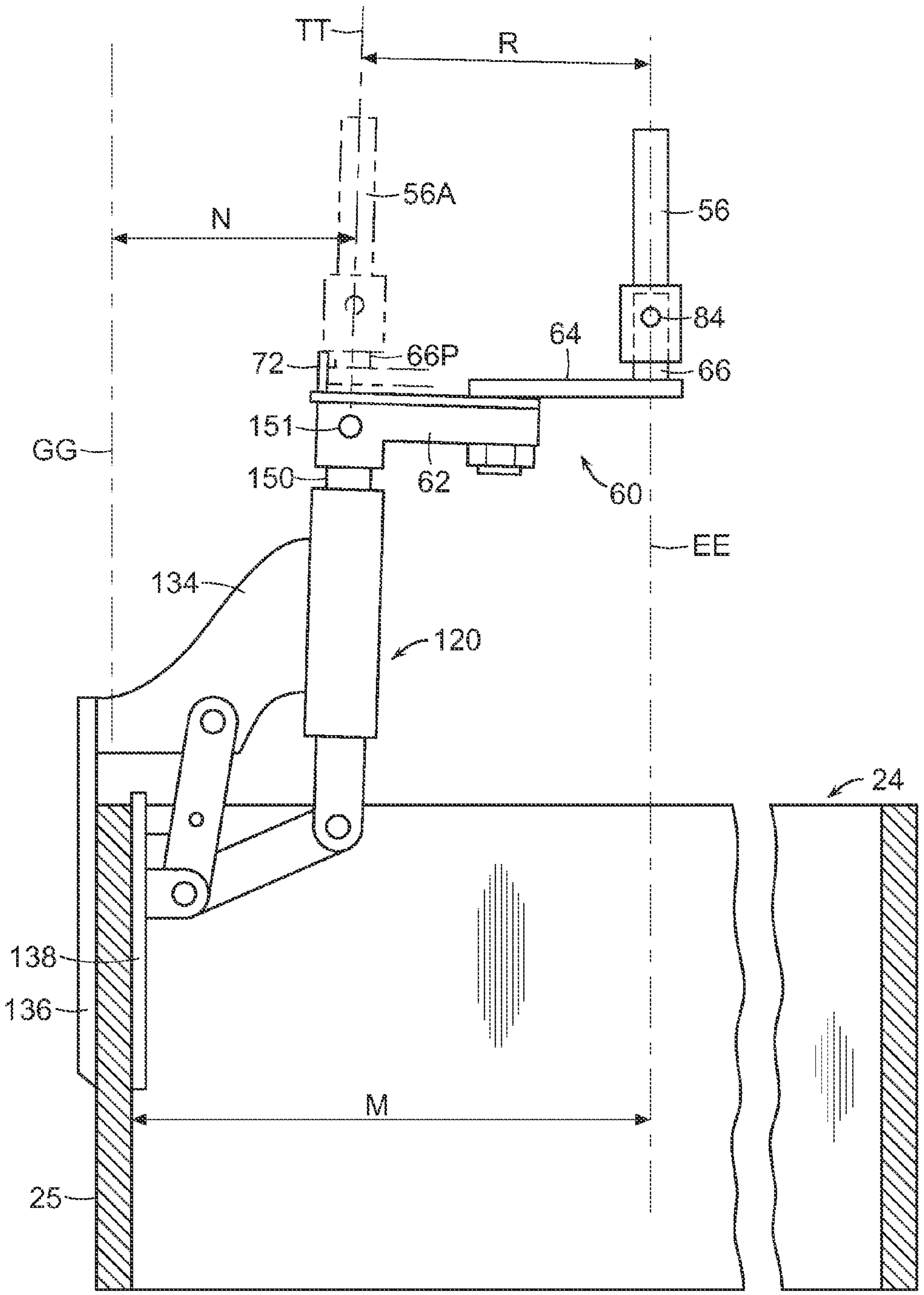
FIG. 9 is an elevation view of the tool of FIG. 6 in combination with a chimney tile shown in cross section, in combination with an adapter for both driving the screw mechanism and for lifting the tool.

FIG. 6 shows exemplary tool 120 which has a quite different appearance from tool 20, but employs similar principles and achieves comparable good results. Tool 120 may be used with an adapter as shown in FIG. 9. The adapter and its use are described below. FIG. 6 is a partial cut-away view of tool 120. FIG. 6A is a partial right-side view. FIG. 7 shows jaw 138. FIG. 8A is a side view and FIG. 8B is an end view of the screw of tool 20. Referring to the foregoing Figures, tool 120 comprises a first arm 134 and a second arm 132 which are pivotably connected at pin 140, for opening and closing of the jaws. (Second arm 132 is shown as a double plate structure for strength and balance of forces; but it will be appreciated that in the generality of the invention arm 132 may be a one plate or a single piece of metal having opposing forked ends. For simplicity of description, it is referred to as if one piece hereafter.) Jaw 138 has an integral tab 131 which is comprised of two parallel plates; by that means jaw 138 is pivotably connected at pin 145 to both the end of arm 132 and toggle link 142. The end of sleeve 144 is preferably fork shape and is pivotably connected at such point to toggle link 142 by pin 135.

Arm 134 has a portion which includes integral tube 146 which extends laterally across line of a vertical axis through pin 140. Screw 150 has a drive end 151 which has a hole 154 for pin connection to a drive and lifting shaft. Screw 150 is journaled within the bore of tube 146. The threaded shaft 152 of screw 150 is engaged with the threaded bore of sleeve 144 which, when the screw is turned, translates within the bore of tube 134 which is an integral part of arm 134. The translating motion of sleeve 144 and its actuation of toggle link 142 is analogous to motion of nut 44 of tool 20 and that tool's actuation of toggle links 42B. Arrows in FIG. 6 show representative motion of the elements when screw 150 is turned; they illustrate how linear motion of sleeve 144 causes toggle 142 to push arm 132 and interconnected jaw 138 toward jaw 136, to grasp a tile when one is present. In tool 120, the toggle element pushes on arm 132 at a location which is comparable to the lower end of an arm of tool 20.

It will be appreciated that when jaw 138 is caused to move toward jaw 136, there is an accompanying jaw 138 motion component that is parallel to the face of jaw 136 and toward the pivot point 140 of the arms, that is, in the upwardly direction in FIG. 6. That motion desirably serves to pull the tool onto the wall of the tile. Preferably, the grasping surface of each jaw comprises an elastomer or polymer facing layer 169A, 169B, for example, 60 Durometer polyurethane of about 0.09 inch thickness. Jaw 136 is fixed to the end of arm 134.

Jaw 138 has an integral stop, or rotation limiter, namely tab 129 which has a slot 137 through which passes pin 133 that connects the tab to arm 132. Limiter 129 prevents unwanted rotation of jaw 138, to keep the grasping surface of the jaw either parallel to the corresponding grasping surface of jaw 136 or at small oblique angle to jaw 136, so there is a mouth opening at the end of the jaws which is greater than the thickness of a tile wall that is being engaged.

Axis TT of the screw of tool 120 is about 3.5 degrees inclined to axis GG, which is in a plane that is parallel to the grasping surface of outer jaw 136. For tool 120 as well as for tool 20 and other embodiments of the invention described herein, the angle of divergence in the upward direction between axis TT and axis GG may vary amongst tools, typically in the range of 0 to 5 degrees, according to reasonable experiment and depending on the particular construction and weight of the tool and the size and weight of tile for which use of the tool is intended. When the axes TT and GG diverge, it can make better the lifting of the tool which holds a tile, and avoiding cocking. When angle TT is within about 5 degrees of parallelism to axis GG, the axes are considered for purposes of this description to be substantially parallel.

Figure 7A:
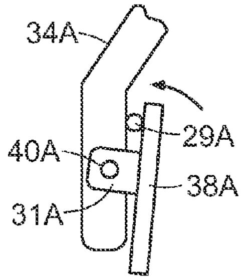
FIG. 7A is a side elevation view of a pivoting jaw.
Figure 12:
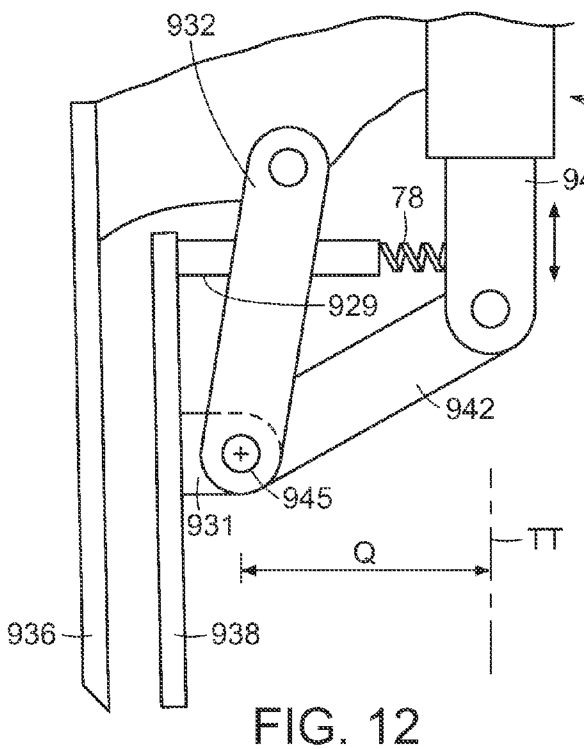
FIG. 12 is a partial view of the lower end of a modification of a lifting tool like that shown in FIG. 6, having an alternative limiter for limiting the pivot angle of a jaw.
Figure 12A:
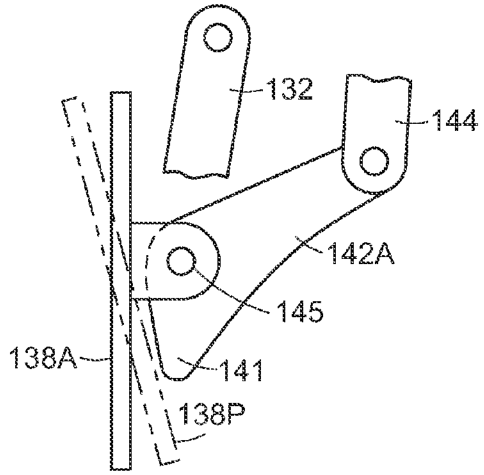
FIG. 12A is a partial view of a modification of the essential tool shown in FIG. 6. showing how a lobe on an arm limits jaw rotation.

FIG. 12 is a partial view of tool 920 which is in most respects like tool 120, showing a different limiter configuration. Jaw 938 is attached to both arm 932 and toggle link 942 at tab 931 by pin 945. The limiter comprises a post 929 with associated spring 78 that contacts the side of sleeve 944. In a variation not shown, only the post or only the spring may be present. When sleeve 944 retracts, jaw 938 will be rotated so the opening of the jaws increases at the lower end of the tool as shown in the Figure, to enable better engagement of the upper edge of a tile wall. FIG. 7A, discussed below, shows a spring 29A which biases a jaw 38*a* to an open-mount orientation. FIG. 12A shows another variation of tool 120 where arm 142A is shaped so it has a lobe 141 that extends outwardly from vicinity of pin 145 toward the mouth opening of the jaws. When jaw 138A pivots, as indicated by the jaw phantom 138P, the degree of rotation will be limited by contact between jaw 138A and lobe 141.

The other tools shown herein, including tools 20, 70, and 720 and variations of those, may also be provided with an inner jaw which pivots with limited motion, where the jaw and arm have a construction and connection the same as or equivalent to what has been described. FIG. 7A shows an example of a simple pivoting jaw. Jaw 38A has a tab 31A that is pivotably connected by pin 40A to the lower end of arm 34A. The jaw can pivot as indicated by the arrow. A metal spring 29A, an elastomer pad, or other resilient biasing means is used to push on the inner end of the jaw, so the jaw is biased to and angle with the opposing jaw as shown in the Figure, where the biasing is consistent with the discussion above about pivoting jaws and limiters.

From the foregoing, it will be appreciated that a limiter is an element of the tool which limits the motion of a pivotable inner jaw. One limiter prevents the outer end of the pivotable inner jaw from moving too far from the outer end of the opposing outer jaw; another limiter keeps the pivotable jaw outer end from moving too close to the outer jaw, so the grasping surfaces are converge in the direction of the tips of the jaws.

Figure 8C:
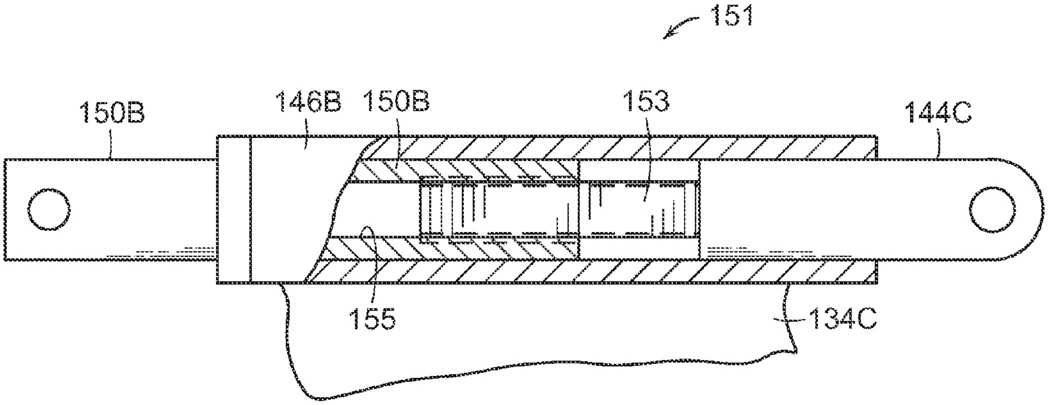
FIG. 8C is an alternate embodiment screw mechanism for the tool of FIG. 6.

The screw 150 of tool 120 is, as shown in FIG. 6, preferably a shaft having an external thread; and, it engages a female threaded element, namely sleeve 144. An alternate embodiment of screw assembly may be used in tool 120, as illustrated by the fragmentary partial cutaway view of FIG. 8C. The driven-element 144C is contained within tube 146B that is integral with arm 134C, and it comprises a male threaded portion 153. The drive element 150B comprises has a female threaded portion 155 which mates with the portion 153. Thus when element 150B is rotated, element 144C is translated lengthwise to transmit motion to the toggle and interconnected jaw.

Figure 12B:
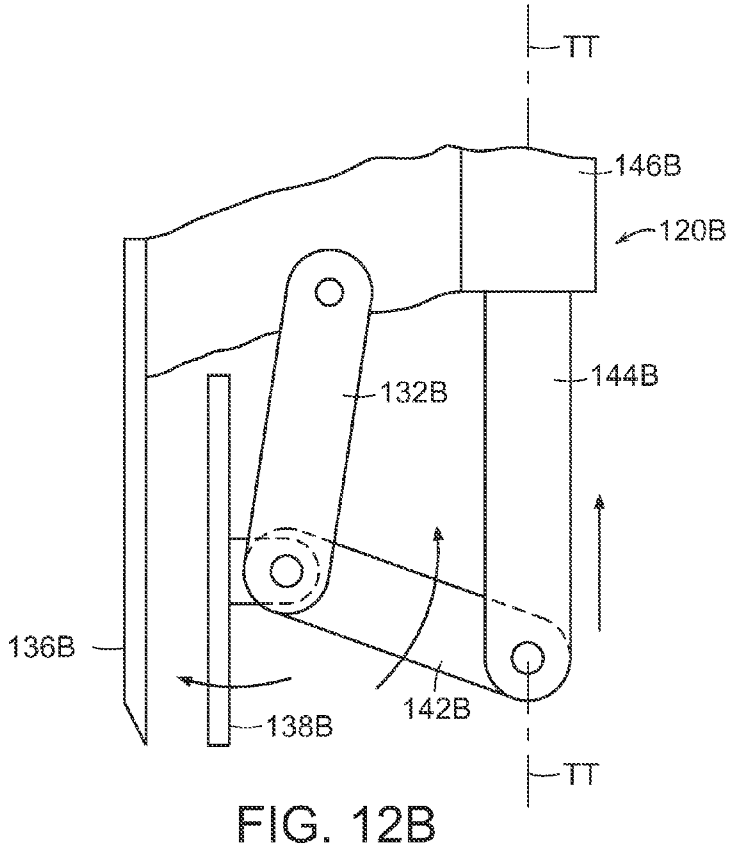
FIG. 12B is a partial view of a modification of the essential tool shown in FIG. 6 where the jaws are closed by pulling rather than pulling of the actuation screw.

FIG. 12B shows that the screw mechanism may transmit motion to an arm and jaw by pulling rather than pushing on the end of a toggling link. FIG. 12B shows a portion of tool 120B, which is in other respects like tool 120. Sleeve 144B moves outwardly from the tube 146B of tool 120B, rather than inwardly as does sleeve 144 of tool 120. Thus, sleeve 144B causes toggle link 142B to become more nearly perpendicular to the axis TT of the screw. That moves arm 132B and associated jaw 138B into closer proximity of jaw 136B.

Figure 26:
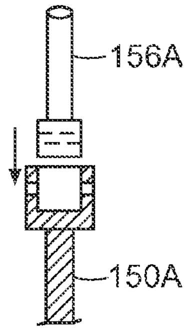
FIG. 26 is a fragmentary partial cross-section view of an alternate embodiment for the upper end of a lifting tool screw and a mating end of a lifting rod.

While the drive end 51, 151 of a screw 50, 150 of exemplary tools 20,120 have been shown as having a male shape, as shown in FIG. 26, alternative embodiment screw 150A may have a female drive end 151B and the lifting rod 156A may have a mating male end. Likewise, in other parts of the invention it will be understood that a female-male mating may alternatively be a male-female mating.

With digestion of the foregoing, the actions of tools 20 and 120 may be viewed in the following context: The screw lies along a first axis of the tool, and moves the nut (or analogous sleeve) along the first axis. The first axis lies in a first plane. The toggle links 42B of tool 20 and the toggle link 142 of tool 120 move in a direction which is parallel to first plane when nut (including an analogous sleeve or cylinder that acts like a nut) to which they are pivotably connected translates along the first axis. Each toggle link is at an incline to the first axis, and movement of the nut (or analogous sleeve or nut) causes the each link to rotate in parallelism to the first plane, in a way which makes it become closer to perpendicularity with the first axis.

The first arm and the second arm move in the first plane due to force transmitted by one or more of the toggle links, to which the arms are connected. A jaw attached to the end of a first arm comprises a flat plate; the jaw has first grasping side and an opposing second side, or outer side. The second outer side of the first-arm jaw is at the location of a second plane which is perpendicular to the first plane; and which plane is furthest from the first axis that a portion of the tool reaches. The outermost portion of the second arm may also be at the location of the second plane. During use of the tool moves vertically adjacent the bore of the chimney so the outer side of the jaw of the first arm slips into the space between the tile and chimney.

When a user is slipping the jaws of a tool around the wall of tile, for control-of-tool purposes it can be desirable to have the point of lifting and lowering force on the tool not too distant from the axis GG of the jaws. On the other hand, when the size of the tile being lifted is large with respect to the offset of the tool, a large offset is desirable to avoid cocking. An adapter helps serve the competing aims.

Figure 10:
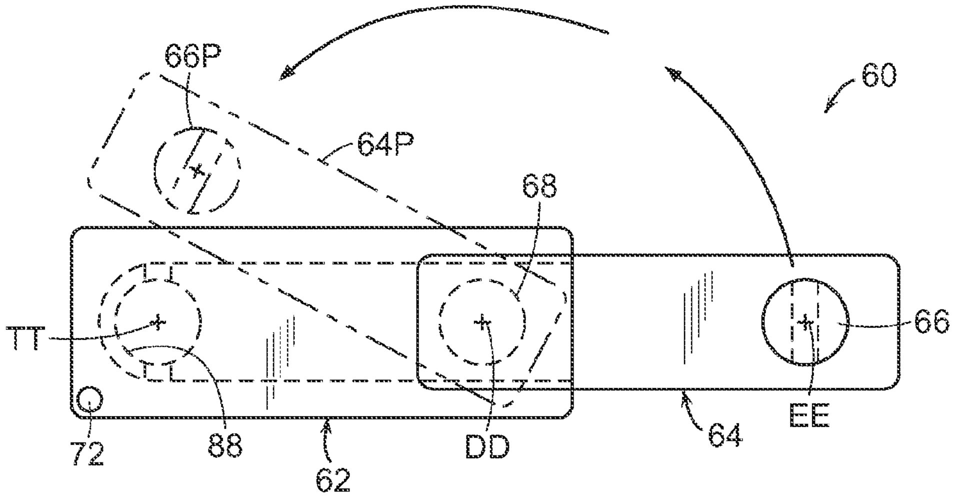
FIG. 10 is a top view of the adapter shown in FIG. 9.
Figure 11:
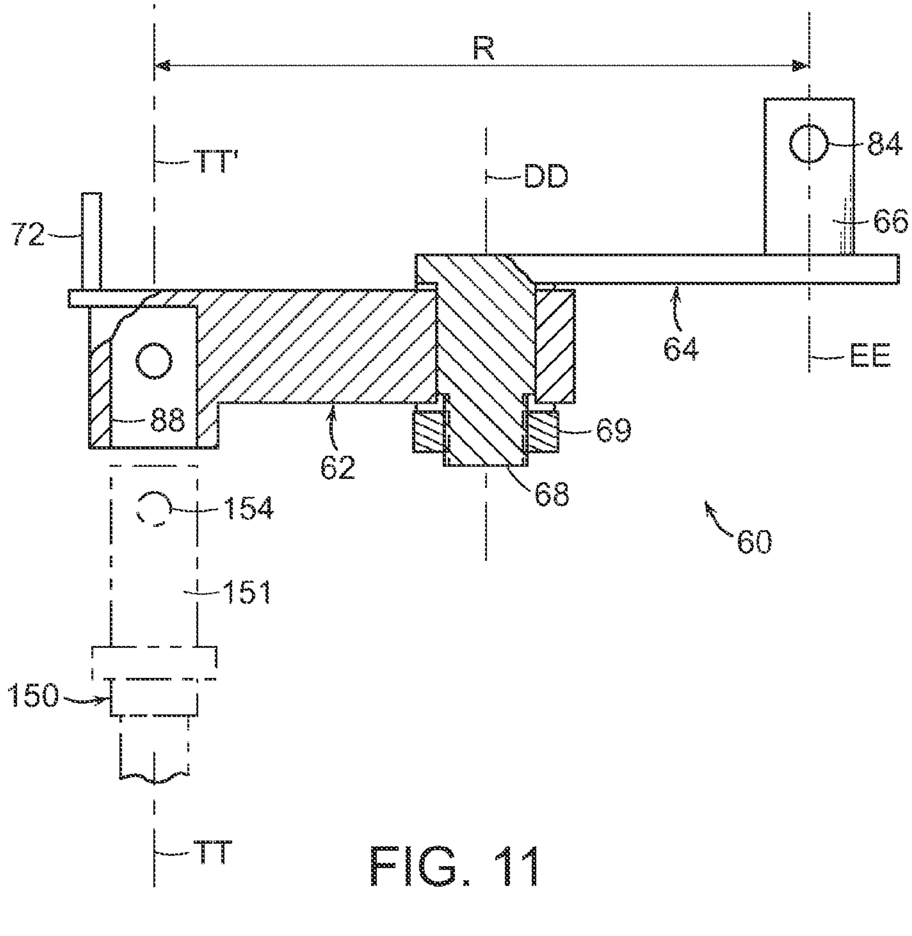
FIG. 11 is a partial-cross section side view of the adapter shown in FIG. 10.

FIGS. 9, 10 and 11 show adapter 60 which can be used with a tool of the present invention. In FIG. 9, adapter 60 is shown mounted on the drive end of the screw 150 of tool 120; and, tool 120 is shown with the jaws grasping the wall 25 of a tile 24. The adapter has two different extreme positions spaced apart a distance R. The two positions are illustrated in FIG. 9 by (a) the location of drive shaft 56 (which is engaged with adapter input shaft 66) and (b) the location of phantom 56A of the drive shaft (which is engaged with the phantom 66P of the input shaft).

Ordinarily, drive shaft 56 is pinned to the input shaft 66 of adapter 60 by pin 84 and the adapter is pinned to the drive end 151 of screw 150 of tool 120 by pin 154. See FIG. 11. Adapter 60 enables a user to rotate the screw of tool 120 by means of the drive shaft, in order to close the jaws on a tile; and, thereafter to change the location to drive shaft and lift the adapter (and attached tool and grasped-tile) by means of the drive shaft while the drive shaft is positioned advantageously for balance of the whole combination.

Referring to FIGS. 10 and 11, the adapter has an input shaft 66 and an output drive socket 88. In use, as drive shaft 56 engages the input shaft and the output socket is engaged with the screw of tool 120. Screw 150 is shown in phantom in FIG. 11.

In a preferred embodiment, the input shaft 66 has the same configuration as the drive end 151 of the screw of a tool. Thus the same drive shaft 56 can be used with and without the presence of the adapter. In other adapter embodiments, the configurations of the input shaft and drive end of the screw may differ; and in still another embodiment the adapter may be made a not-readily-removable part of the tool.

Adapter 60 comprises a body 62 and a tang 64. Tang 64 is rotatably connected to body 62 by stub shaft 68 which lies along axis DD. Stub shaft 68 fits within a journal-hole in body 62 and is held in position by nut 69. Input shaft 66 extends vertically along axis EE, parallel to axis DD. Socket 88 has an associated axis TT'. Socket 88 is shaped to engage the drive end 151 of the screw of a tool and thus ordinarily axes TT and TT' will coincide.

Referring further to FIGS. 10 and 11, the distance between axis DD and axis EE is preferably the same as the distance between the axis EE and axis TT'. The sum of the distances is R, the maximum extension of the adapter. Thus when tang 64 is rotated about stub shaft 68 (and axis DD) as indicated by the arrows and the phantoms 64P and 66P in FIG. 10, the stub shaft 66 will lie directly above the socket 88. Such coincident locating is facilitated by post 72 which projects upwardly from the top surface of body 62 and limits rotation of the tang. Alternative configuration stops, including a lip or a detent, or a feature on the tang for the same purpose, may be used.

Referring again to FIG. 9, distance R is the maximum distance achievable between axis TT' of tool 120 and the axis EE location of the input shaft of adapter 60. Distance M is the sum of the distance R and the tool offset N. Ideally, axis EE as shown in FIG. 9 would run through the center of gravity of the whole assembly of adapter, tool, and tile, to provide zero tendency for the assembly to tilt. Practically, the dimension M for a tool and adapter combination may be an approximation for an assembly will works well.

In one use of the combination of tool and adapter, the adapter is connected to the tool and a drive shaft is connected to the adapter input shaft. The tang is rotated so the input shaft 66 is positioned along or in proximity to the axis TT of the tool. The combination is then lowered by means of the drive shaft into the cavity of a chimney with the jaws open. By jiggling and pushing on the drive shaft (and possibly using another line or an entirely separate tool), one jaw is lowered into the space 28 between the tile and bore of the chimney. The user rotates the drive shaft which rotates the tang, and thereby the whole adapter as the tang hits the post. Rotating the adapter rotates the input end of the screw of the tool which causes the jaws to close and to tightly grasp the wall of the tile. Then the user reverses the rotation of the shaft, causing the tang to anti-rotate and achieving the maximum distance R, or if desired an intermediary distance. Then the drive shaft is pulled upwardly, with jiggling or accessory tool motion as needed, to lift the entirety of adapter, tool and tile from the chimney bore.

In other embodiments of the adapter, the distance between axes DD and EE of the tang may be somewhat longer or shorter than the distance DD and TT', and the adapter will function adequately. In still another embodiment the length of the tang may be made adjustable to different distances R can be obtained with the same adapter.

Figure 13:
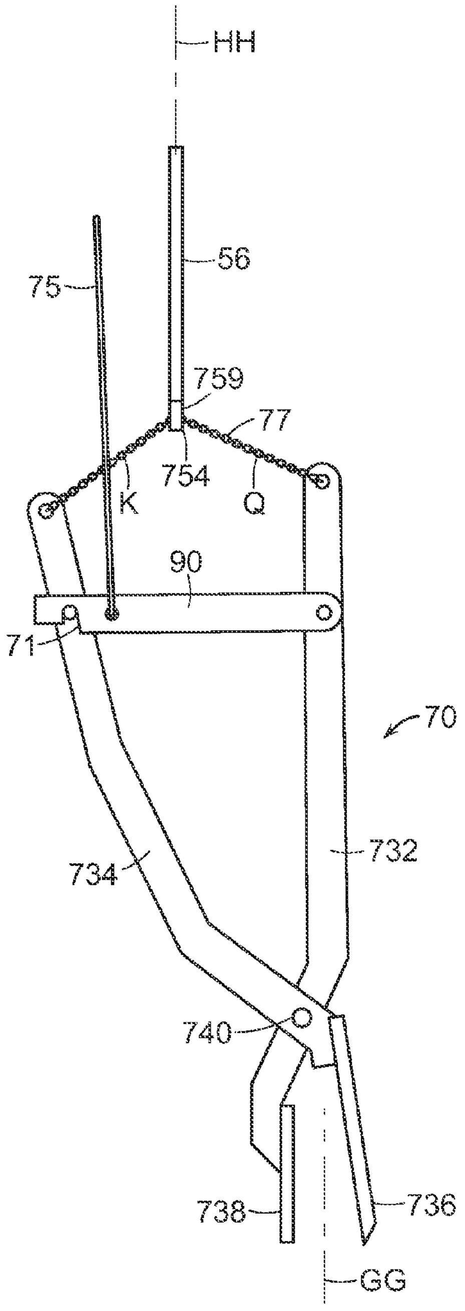
FIG. 13 is an front view of an embodiment of lifting tool having a latch and a chain for closing the jaws, where the tool is in latched condition with jaws spread widely apart, for lowering onto a tile.
Figure 14:
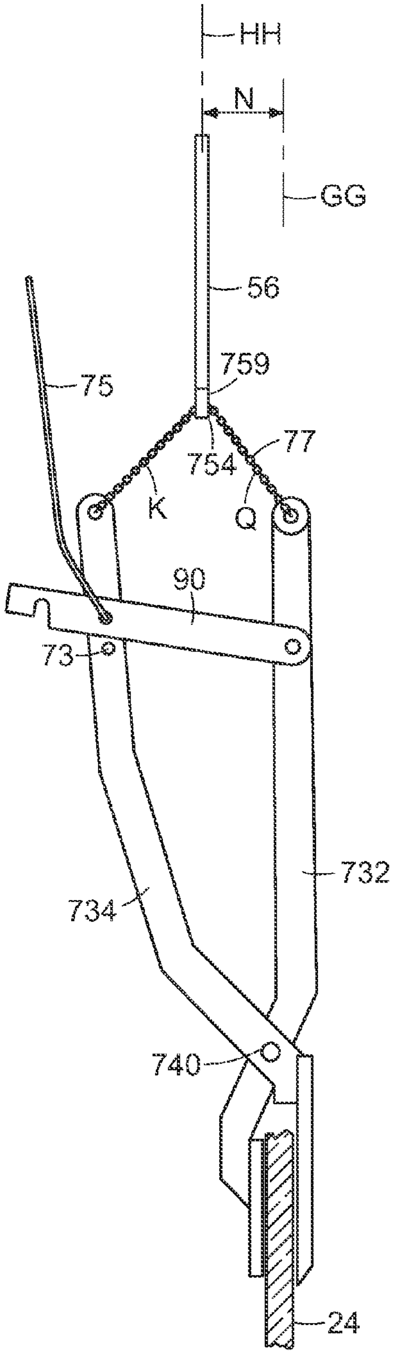
FIG. 14 shows the tool shown in FIG. 13 with the latch released, and with the jaws closed on a tile.

FIG. 13 and FIG. 14 illustrate tool 70 which embodies concepts in common with the tools 20 and 120, and further comprises a latch 90 which is actuated during use of the tool.

The tool has arms 734, 732 and jaws 738, 736 that are similar to those of tool 20. The arms are pivotably connected by pin 740. The upper ends of arms 734, 732 are connected by chain 77 which runs through loop end 759 of lifting rod 56. The lifting point 754 of tool 70 is at the approximate midpoint of the chain. On either side of the lifting point is a chain half K, Q, which chain half serves as a toggle element for moving the first or upper end of each arm. The toggle elements K, Q are connected directly to each other. The chain halves will be approximately equal in dimension, according to where the loop end 759 is positioned. By jostling rod 56, a user may move loop 759 laterally (left-right in the Figures), to thereby alter the exact location of the lifting point and the angle at which tool 70 hangs relative to vertical and the axis of rod 56, both before and after a tile is grasped. A chain is a preferred flexible member for connecting the upper ends of the arms because inherent irregularities along its length make the loop end of the lifting rod resist unwanted lateral sliding motion along the chain. Other connecting ligaments which have shape-irregularities may be substituted for a chain.

It will be appreciated that when the tool is suspended from a lifting rod, there is a force in the chain halves which urges the upper ends of the arms toward each other. Thus, the chain halves K, Q act like toggles. As described below, solid metal toggles may be substituted for the chain halves in other embodiments of tool 70.

In FIG. 13 tool 70 is shown with the latch in it engaged position, so it holds arms 734, 732 and associated jaws 738, 736 in a spaced apart orientation. That facilitates lowering of the tool within a chimney to engage the wall edge of a tile. Latch 90 is pivotably attached to arm 732 and has a slot 71 that engages pin 73 that projects from the surface of arm 734. Lanyard 75 is attached to the latch in vicinity of slot 71 and runs upwardly to a location where the user can pull on it to lift the latch. A light weight rod is substitutional for the lanyard.

In FIG. 14, tool 70 is shown after a user has lifted latch 90 from pin 73 and has let lanyard 75 become slack. The lower edge of latch 90 is resting on pin 73 which has moved inward. That is because when latch 90 is lifted, upward force on chain 77 exerts an inward toggle action force by means of chain halves K, Q on the upper ends of arms 734, 732 arms. That pivots the arms about their connecting pin 740 and closes the jaws, to grasp the wall of a tile 24, shown in phantom. The tile can thus be then lifted vertically. To the extent there is any hindrance due to cocking of the tile, the user can lessen the upward force and jostle the loop 759 sideways along the chain, and then resume lifting.

Other variations and known means for latching and releasing a connection between things like the arms may be used in carrying out the invention in alternative embodiments of tool 70. For example, the latch may have a pin at its free end which slips into a slot or pocket on an arm. FIG. 15-18 illustrate some alternative embodiments of tools like tool 70, where the latch is lifted by rotary action of a vertical screw or shaft. Each Figure shows a portion of the upper end of a tool.

Figure 15:
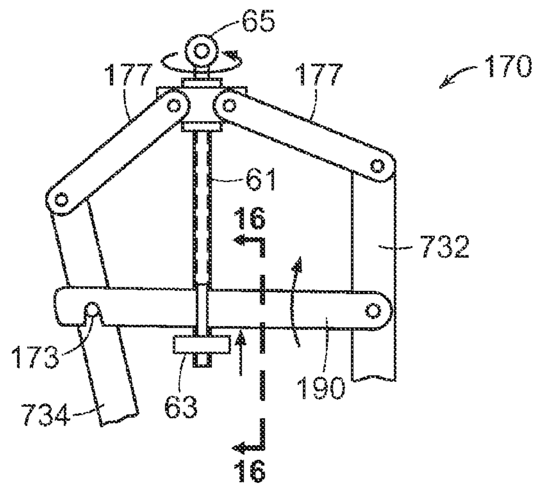
FIG. 15 is a partial view of a tool like that of FIG. 13 having links instead of a chain at the upper ends of the arms and a screw-type latch-lifting mechanism.
Figure 16:
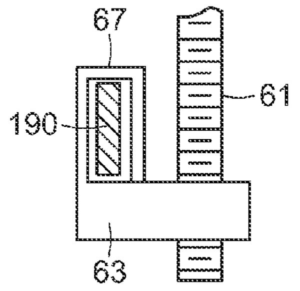
FIG. 16 shows a detail of the latch-lifting mechanism of the tool in FIG. 15.
Figure 17:
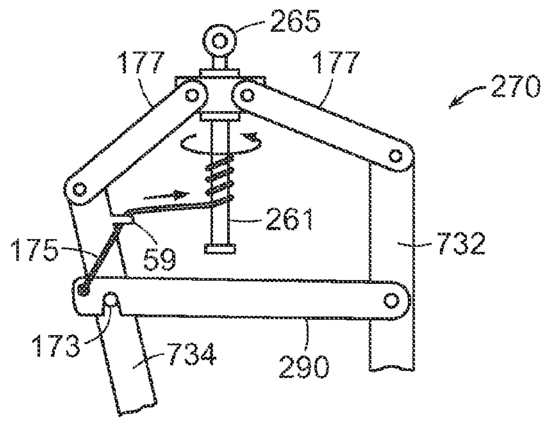
FIG. 17 is a partial view of a tool like that of FIG. 15, having a screw-wound lanyard which lifts the latch.

Tool 170 in FIG. 15 and tool 270 in FIG. 17 have flat metal toggle links 177 connecting the upper ends of the arms, instead of a chain. The links 177 are thus indirectly connected to each other. (The same construction may be alternatively be used in tool 70.) As indicated by the arrows, latch 190 of tool 170 is lifted when the ring end 65 of threaded shaft 61 is rotated. Shaft 61 is captured in the collar where the upper ends of links 177 are connected, as previously described. Shaft 61 runs through a threaded opening in pawl 63. As shown in the vertical cross section detail of FIG. 16, pawl 63 has a loop 67 which keeps it in contact with latch 190. Turning screw 61 lifts the pawl and thus lifts the latch from pin 173.

Tool 270, shown in FIG. 17, has a similar rotatable shaft 261 which may or may not have threads. As indicated by the arrows, rotation of shaft 261 by means of ring 265 causes lanyard 175 to be wound about the shaft, to which it is fastened. The lanyard runs through guide 59 on arm 734 to the end of latch 290.

Figure 18:
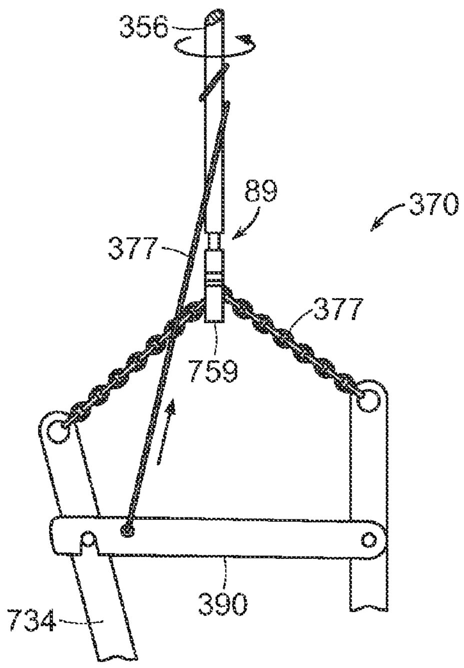
FIG. 18 is a partial view of a tool like that of FIG. 13, where the latch is lifted by being wound around the lifting rod.

FIG. 18 is a partial view of a tool like tool 70, showing the upper end. Lanyard 377 runs upwardly from the end of latch 390 to the rotatable lifting rod 356, to which it is attached. Swivel 89, where rod 356 connects to ring 759, enables the rod to be rotated, thereby causing the lanyard to wind about the rod, and lifting the latch.

Figure 27:
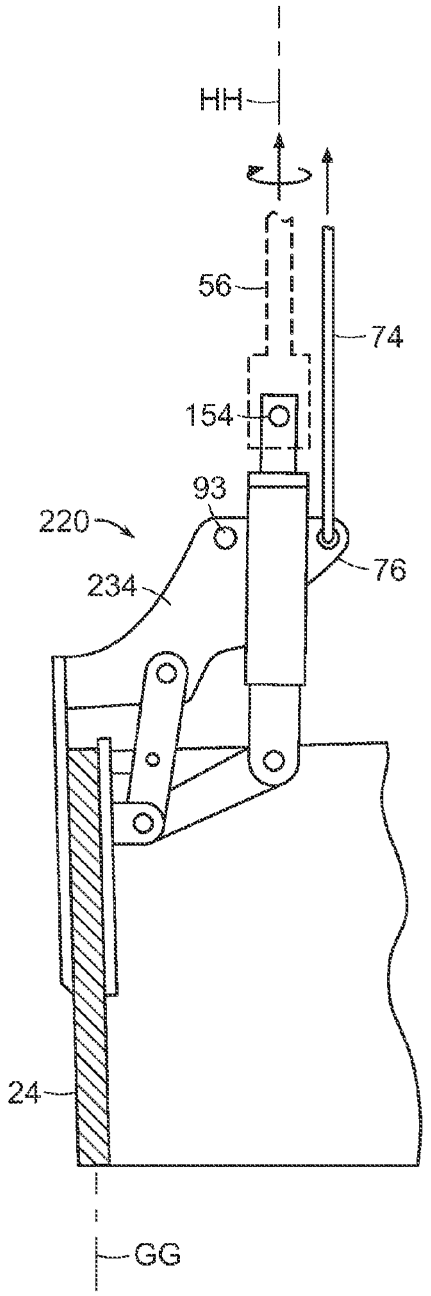
FIG. 27 is a view of a modification of the tool shown in FIG. 6 in combination with a chimney tile in partial cross section, also, showing auxiliary lifting means.

FIG. 27 and FIG. 28 respectively show tools 220 and 320, which are respectively like tools 120 and 20, along with an auxiliary tool-lifting means, such as a cable or the like, that is connected to the tool, to enable lowering and lifting of the tool with a controllable angle, so the edge of a tile is readily engaged and so any cocking of the tile is minimized to avoid jamming of a tile in the chimney as it is being lifted. The feature now being described may be similarly applied to tools like tool 70 and its variations. In these embodiments, during use of the tool a rod 56 will be pinned to the lifting point 154, 354 of the tool. Thus, the rod may optionally be used for lifting along with the one or more cables, or the rod may be used only for turning of the screw of the tool.

Tool 220 has a tab 76 which extends inwardly, away from the location of the jaws (axis GG) and toward what, in use, is the center of the chimney. A cable 74, or other lifting ligament or rod, runs upwardly from a hole or other connection in the tab 76. A like lanyard may be connected at hole 93 in arm 234 on the opposite side of the screw-barrel of the tool, and both lanyards may be used in coordination. Tool 320 has an extension 333 of arm 338 which a connection feature, preferably a hole, for a lifting cable or light weight rod 74. Arm 332 may be similarly extended and a second cable or the like connected to it.

Figure 24:
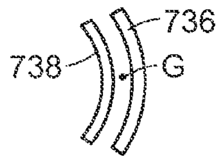
FIG. 24 is an end view of jaws for a lifting tool, where the jaws are shaped to engage a circular tile.

In the several embodiments which have been described, the jaws may be replaceable and may have alternative shapes. For example, FIG. 23 shows a tool 620 which has symmetrical shape arms 634,632 which are pivot connected at pin 640. The means for closing the arms/jaws is only suggested in the FIG. 23 and may be one of the several embodiments which have been described. Jaws 636, 638 are at the ends of sub-arms 682, 684 which are respectively bolted to the ends of arms 632, 682. As pictured, the sub-arms have a lot of offset so that a desired offset N, or distance between axes GG and TT may be achieved. Accordingly, a tool may be provided with different size and shape jaws, and different amounts of offset N. FIG. 24 shows in end view the grasping portions of alternative embodiment jaws 738, 736. The jaws have a curved shape for grasping round tiles.

Figure 20:
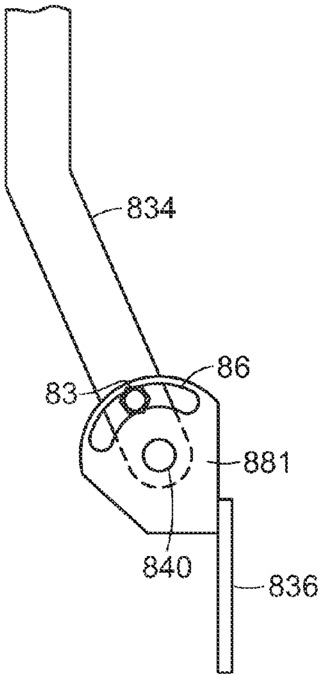
FIG. 20 shows a lifting tool arm with a continuously adjustable-angle jaw

FIG. 19-22 illustrate aspects of tools which have jaws that have adjustable angles relative to the arms to which they are attached. FIG. 19 and FIG. 20 show an arm 734, 834 and associated jaw. Each arm/jaw is one of two mating arms/jaws for a tool such as tool 20. It will be appreciated from the prior description that the mating arms connect pivot points 740, 840. The mating arm, such as arm 832 shown in FIG. 21, and its associated jaw 838 has analogous adjustable-angle construction to the arm which is described here, such as arm 834. Further, as mentioned above the jaw 838 preferably has a pivotable connection. See FIG. 6 and FIG. 7 and the associated discussion.

Referring to FIG. 19, jaw 736 comprises a flat plate stub arm 81 to which it is welded. Stub arm 81 that is rotatable about point 740, so the angle of jaw 736 can be changed relative to the local axis JJ of arm 734, as indicated by the arrows and the phantom jaw 736P. A nut-fastened stud or bolt 83 fits into a selected hole 85 of the stub arm 81 to hold the arm and jaw 736 at a discrete selected angle. FIG. 20 shows a largely similar arm 834 having a pivot point 840 and a jaw 836. The jaw has a flat plate stub arm 881 that has a slot 86, into which fits bolt/stud 83. Thus any continuous angle within the range of the slot may be chosen for the jaw orientation relative to the arm.

Figure 21:
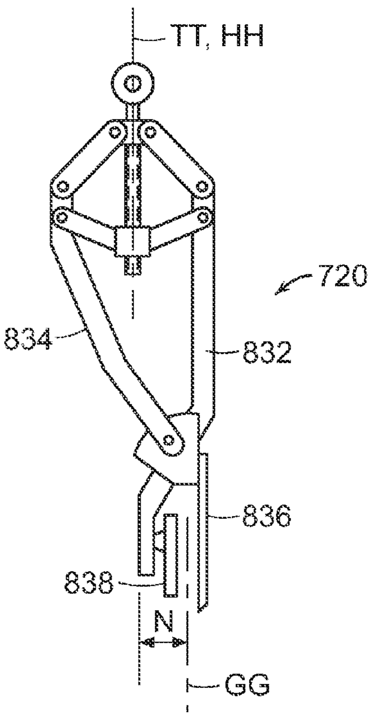
FIG. 21 shows a lifting tool with adjustable angle jaws at a first angular orientation.
Figure 22:
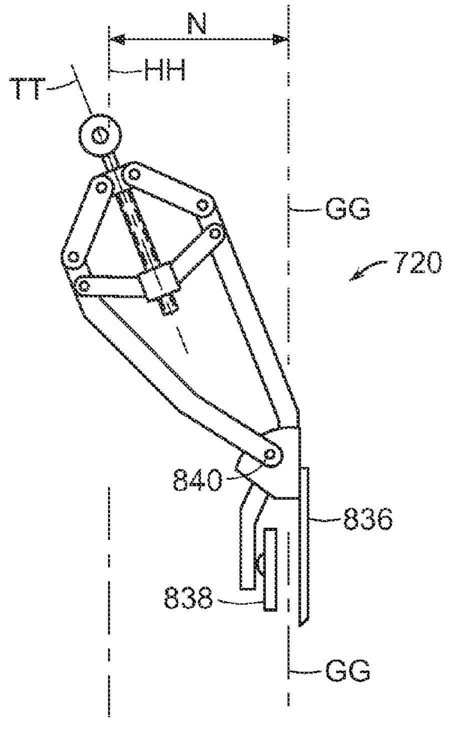
FIG. 22 shows a lifting tool with adjustable angle jaws at a second angular orientation.

FIG. 21 and FIG. 22 illustrate the benefit of the adjustable angle jaw feature. FIG. 21 shows exemplary tool 720 with jaws at a first angular orientation, and FIG. 22 shows the same tool with the jaws at a second angular orientation. The amount of angular change is exaggerated, compared to an ordinary use of a tool, for purpose of illustration. In FIG. 21, the offset N, or distance between screw axis (and lifting axis HH which is coincident in this embodiment and orientation) has a first dimension. Axis GG of the jaws is parallel or close to parallel to axis TT. In FIG. 22 the offset distance N is increased and there is a significant angle between axis GG and axis TT. It will be appreciated that when the tool has the configuration shown in FIG. 22 the tool will be better adapted to pick up, in balanced fashion, a tile which has a center of gravity that is far from the outer jaw 836 and wall where the tile is being grasped. Reference should be made to FIG. 3.

Figure 29:
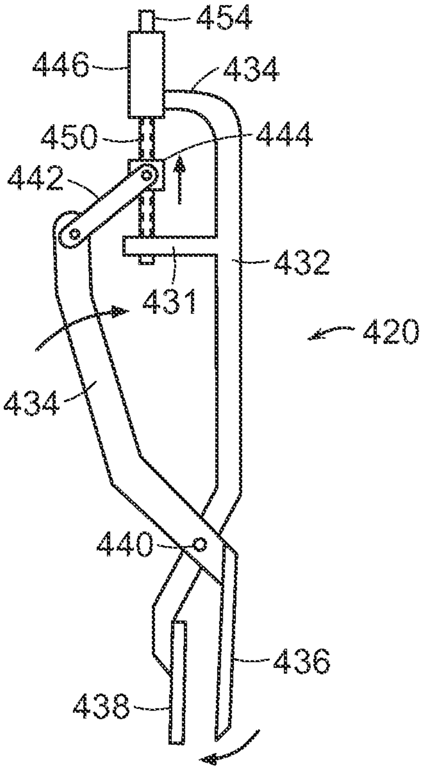
FIG. 29 is an elevation view of another embodiment of lifting tool, where the tool has a toggle link and a screw mechanism.

FIG. 29 shows an alternate embodiment tools which employs essential principles of the tools described above. Arrows in the Figures indicate motion of the parts upon actuation, similarly to the way in which things have been described above. FIG. 29 shows alternate embodiment tool 420. Arms 432, 434 are pivotably connected at pin 440 and have respective jaws 438, 436. The upper end 446 of arm 432 runs laterally across a vertical line which runs through pin 440. Screw 450 is journaled in a hole in the laterally extending portion, in the same way in which screw 50 captured in bar 46 of tool 20. The lower end of the screw is rotatably received in a hole in support arm 431. Nut 444, which acts analogously to nut 44 of tool 20, is connected by toggle link 442 to the upper end of arm 434. Thus rotating of the drive end 454 of screw 450 causes the nut to move along the thread of the screw and, by means of the toggle arm, to apply force to the upper end of 434, thereby reducing the spacing between the jaws to grasp a tile wall.

While the invention has been described in terms of lifting ceramic tiles from a masonry chimney, the invention may be used for lifting other kinds of tiles from other kinds of vertical bores. Thus in this description and the claims the term tile shall comprehend equivalents which are made of materials other than ceramics; and, the term chimney shall comprehend other structures comprising vertical openings having removable segmented liners, irrespective of whether such other structures are used for flue gases. For example, water wells are equivalent chimneys in the earth may have liners.

The invention, with explicit and implicit variations and advantages, has been described and illustrated with respect to several embodiments. Those embodiments should be considered illustrative and not restrictive. Any use of words which relate to the orientation of an article pictured in space are for facilitating comprehension and should not be limiting should an article be oriented differently. Any use of words such as “preferred” and variations thereof suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A tool, for lifting a liner tile from the interior of a chimney or other vertical cavity, for use when a principal axis of the tool is in a vertical orientation, said tool comprising:

a first arm having a first end and a second end;

a second arm, having a first end and a second end, the second arm pivotably connected to the first arm by a first pin;

two jaws each having a tile-wall grasping surface and connected to the second end of the arms, wherein pivoting of the arms about the first pin moves the tile grasping surfaces of the jaws so said surfaces are opposingly spaced apart a desired distance, wherein said surfaces are equidistant from a first axis (GG); wherein a portion of at least one of the jaws is a flat or curved plate, for fitting into a space between the liner tile and the interior side of a chimney;

an actuating mechanism connecting the first ends of the arms, for moving the first ends of the arms relative to each other and for thereby opening and closing the jaws, the actuating mechanism further comprising:

a screw journaled in an element of the actuating mechanism that is connected directly or indirectly to one or both of the arms, the screw having a threaded portion and a lifting end which is connectable to a lifting rod, the lifting end shaped for both lifting the screw along with the rest of the tool and for rotation of the screw;

the principal axis (HH) of the tool running through a location of the lifting end of the screw; and wherein the first axis (GG) is spaced apart from the principal axis (HH);

a nut engaged with the threaded portion of the screw, so the nut moves along the length of the screw when the screw is turned;

at least one toggle element connecting the nut and one of the arms, so movement of the nut along the length of the screw moves the toggle and thereby one of the one arms; and wherein the actuating mechanism comprises four of said at least one toggle elements and a bar; wherein the bar is connected to the first end of each of the arms respectively by a first toggle element and a second toggle element, wherein the screw is journaled in the bar with the lifting end in proximity to the bar; wherein third and fourth toggle elements respectively connect the nut to the first end of the first arm and the first end of the second arm; wherein movement of the nut along the length of the screw moves both arms by acting through said toggle elements.

2. The tool of claim 1, wherein the first pin is located between the first axis (GG) and a principal axis (HH).

3. The tool of claim 1, further comprising a lifting rod connected to the lifting end of the screw directly, or optionally indirectly by means of a universal joint, whereby the tool may be lifted and the screw may be rotated by actuation of said rod.

4. The tool of claim 1, further comprising at least one lifting element connected to the tool at a location which is spaced apart laterally from the principal axis in a direction opposite to the direction in which lies the first axis (GG), for lifting a tile grasped in said jaws, said tile has a center of gravity that is offset from the principal axis (HH).

5. The tool of claim 1, wherein the jaw of said at least one arm which comprises said flat or curved plate portion is fixedly attached to the arm; and, wherein the jaw connected to the second arm is pivotably connected to the second arm; the tool further comprising a rotation limiter connected to the second arm or to the jaw at the second arm, for limiting the degree of pivoting of said jaw.

6. The tool of claim 1, wherein each of the arms comprises a sub-arm portion at the second end, wherein the jaw of each of the arms is connected to the one of the arms at the sub-arm portion; wherein the sub-arm portion of each one of the arms is pivotable relative to a remainder one of the arms, so the orientation of the grasping surfaces of the jaws may be angled relative to an principal axis (HH), to thereby change the angle or a distance between the principal axis (HH) and the first axis (GG).

7. The tool of claim 1, wherein each of the arms comprises a detachable portion near the second end of the arms, to which the jaw of the arms is connected.

8. The tool of claim 1, further comprising an adapter mounted on the lifting end of the screw, for transmitting rotational or lifting force to the screw, the adapter comprising:

a body having a first end having a feature shaped for fastening to the lifting end of the screw and a spaced apart second end, the body extending transversely to the principal axis (HH) of the tool;

wherein said first end feature is connected to the lifting end of the screw;

a tang, having a first end pivotably connected to the second end of the first body and a second end having a feature shaped for receiving and fastening to the end of a lifting rod that is adapted for both rotating and lifting the feature and thereby the adapter and whole tool;

wherein when the tang is laterally rotatable about the body and the axis of screw, so that said feature at the second end of the tang may be alternately positioned in alignment with the screw or spaced part from the screw, for lifting a tile having a center of gravity that is offset from the principal axis (HH).

9. The tool of claim 8 in combination with a lifting rod for lifting of the tool and rotating an element of the tool, wherein the feature at the second end of the tang and the lifting end of the screw have substantially the same shape for engaging the lifting rod, wherein the lifting rod is connected to said feature at the second of the tang.

10. The tool of claim 9 further comprising a post extending upwardly from first end of the body, positioned for contacting and limiting the motion of the second end of the tang when the tang is rotated about the tang first end, wherein the post stops rotation of the tang at a point where the second end of the tang is aligned with the first end of the body of the adapter.

11. A tool, for lifting a liner tile from the interior of a chimney or other vertical cavity, for use when a principal axis of the tool is in a vertical orientation, said tool comprising:

a first arm having a first end and a second end;

a second arm, having a first end and a second end, the second arm pivotably connected to the first arm by a first pin;

two jaws each having a tile-wall grasping surface and connected to the second end of the arms, wherein pivoting of the arms about the first pin moves the tile grasping surfaces of the jaws so said surfaces are opposingly spaced apart a desired distance, wherein said surfaces are equidistant from a first axis (GG); wherein a portion of at least one of the jaws is a flat or curved plate, for fitting into a space between the liner tile and the interior side of a chimney;

an actuating mechanism connecting the first ends of the arms, for moving the first ends of the arms relative to each other and for thereby opening and closing the jaws, the actuating mechanism further comprising:

a screw journaled in an element of the actuating mechanism that is connected directly or indirectly to one or both of the arms, the screw having a threaded portion and a lifting end which is connectable to a lifting rod, the lifting end shaped for both lifting the screw along with the rest of the tool and for rotation of the screw;

the principal axis (HH) of the tool running through a location of the lifting end of the screw; and wherein the first axis (GG) is spaced apart from the principal axis (HH);

a nut engaged with the threaded portion of the screw, so the nut moves along the length of the screw when the screw is turned;

at least one toggle element connecting the nut and one of the arms, so movement of the nut along the length of the screw moves the toggle and thereby one of the one arms; and wherein the first arm has a first end portion which runs laterally transverse to the principal axis; further comprising a tube fixedly attached to said laterally running first end portion; wherein the screw and the nut of the actuating mechanism are journaled within the tube; wherein the nut is slidably moveable within the tube when the screw is rotated; and wherein at least one toggle of the elements connects the nut with the second arm.

12. The tool of claim 11, wherein the jaw of the first arm comprises said flat or curved plate portion, said portion is fixedly attached to the second end of the first arm; and wherein the jaw of the second arm is pivotably connected to the second end of the second arm; further comprising a rotation limiter connected to the second arm or to the jaw which is connected to the second arm.

* * * * *